July 6, 1943.   W. L. DIETER   2,323,316
SEAM CONSTRUCTION
Filed June 20, 1939   2 Sheets-Sheet 1
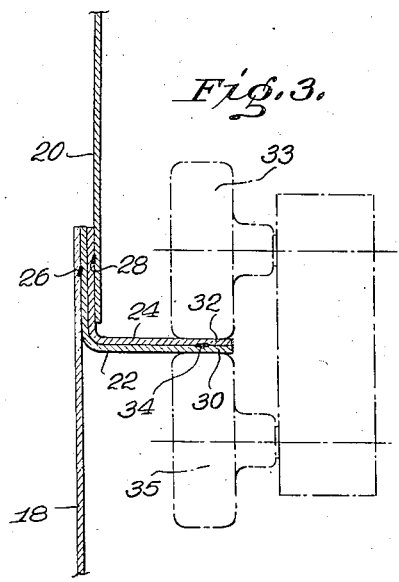
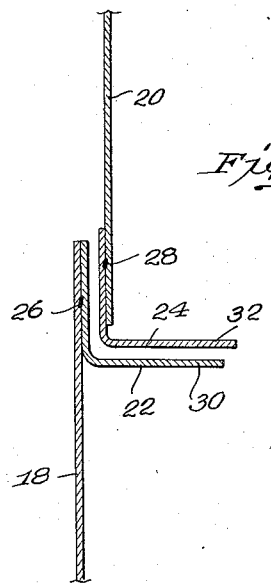
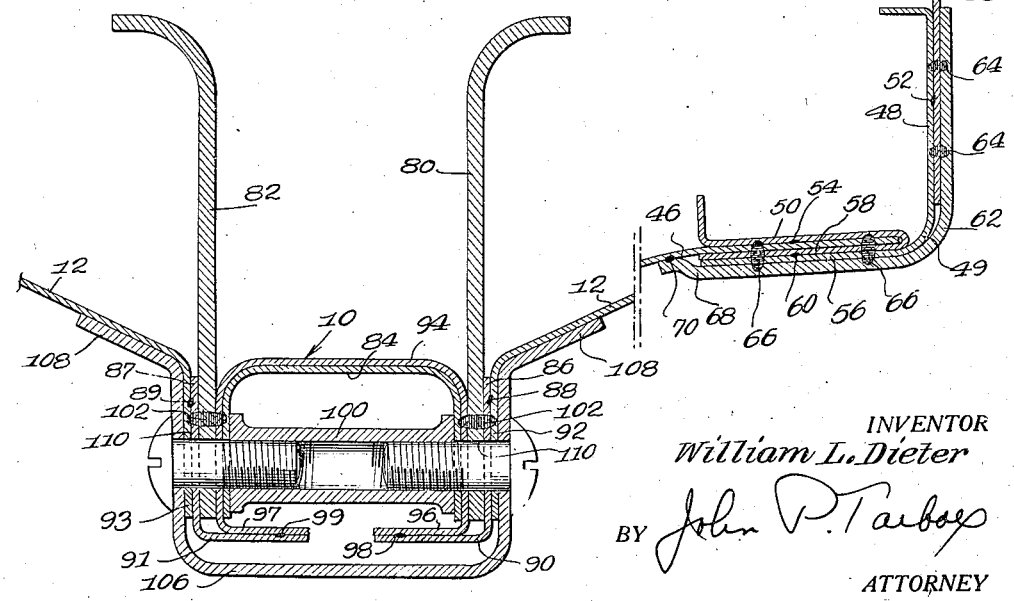
INVENTOR
William L. Dieter
BY John P. Tarbox
ATTORNEY July 6, 1943.   W. L. DIETER   2,323,316
SEAM CONSTRUCTION
Filed June 20, 1939   2 Sheets-Sheet 2
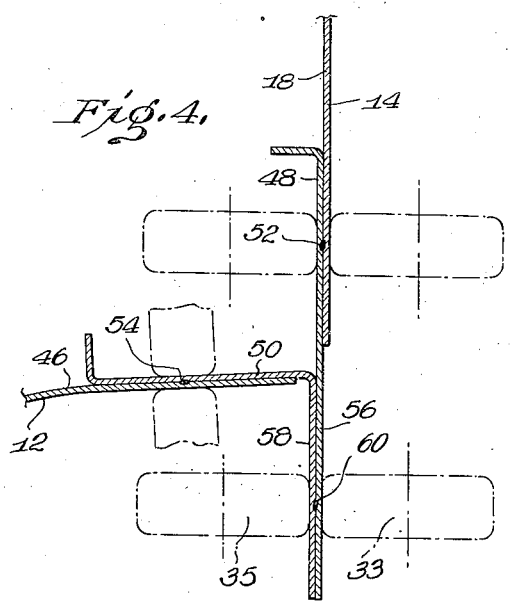
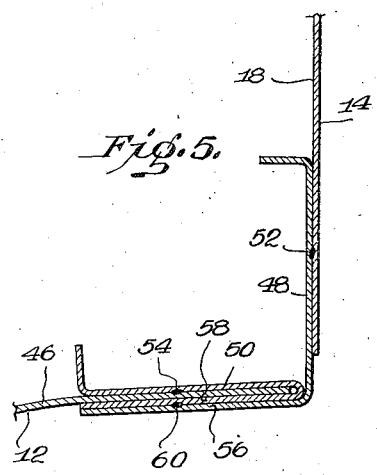
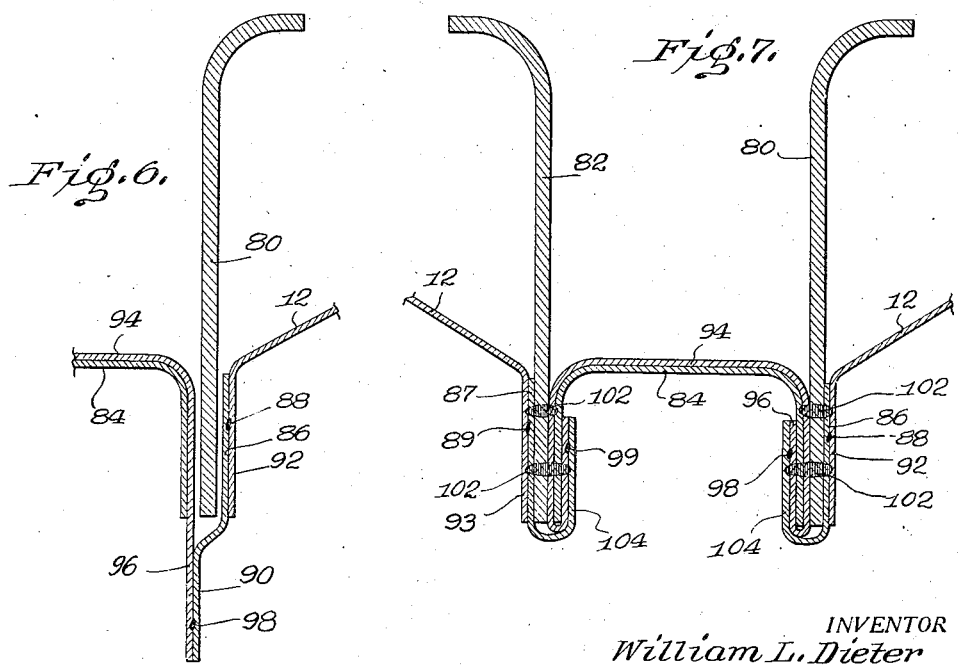
INVENTOR
William L. Dieter
BY John P. Tarbox
ATTORNEY Patented July 6, 1943

2,323,316

UNITED STATES PATENT OFFICE 2,323,316

SEAM CONSTRUCTION

William L. Dieter, Allentown, Pa., assignor to Edward G. Budd Manufacturing Company, Philadelphia, Pa., a corporation of Pennsylvania Application June 20, 1939, Serial No. 280,040

5 Claims. (Cl. 189—36)

This invention relates to a seam construction and more particularly to a water tight seam construction especially adapted for fabrication from stainless steel by electrical welding.

In making the seams between lapped sheets of stainless steel by electric seam welding it is necessary that access be had to both sides of the lapped sheets which in many constructions is not readily possible. Furthermore, in the making of seam welds rollers are employed as the electrodes and the seam weld must be so positioned with respect to adjoining structure as to leave sufficient room for rollers of sufficient diameter to engage the lapped sheets along the line on which a seam weld is to be effected.

Stainless steel which is employed for air craft structures is rolled and worked so as to produce tensile strength in the neighborhood of 185,000 pounds per square inch and stainless steel sheets having this tensile strength, while being formable to a certain degree, may not safely be subjected to reverse bends. The present invention contemplates the use of soft stainless steel sealing strips at lapped joints which may be subjected to reverse bends and which may be worked and formed so that after welding the sealing strips may be folded or doubled back upon themselves in order to lie flat along the seam. The invention contemplates the seam welding of a sealing strip to each of the stainless steel sheets along the edge where a lapped joint is desired and thereafter forming a seam weld between the sealing strips when bent to a position rendering access to seam welding rollers. Thereafter the sealing strips may be formed or bent out of the way to any particular position or to lie flat along the joined plates. The seam has special application in the construction of hulls of sea planes, boats, pontoons, but may also be used in connection with the construction of tanks as well.

An object of the invention is to provide a seam construction which may be readily effected between adjoining or lapped sheet members and which joint may be rendered fluid tight by seam welding and access during seam welding from one side only.

Another object of the invention is to provide a seam construction which may be readily effected and which may conform neatly to the contour of the sheets joined by the seam construction.

A further object of the invention is to provide a seam construction in which roller welding may be employed for rendering the seam construction water tight and in which spot welds may be employed for securing the members together in shear.

Yet another object of the invention relates to a novel method of effecting the seam weld of the present invention.

The above and other novel features of the invention will appear more fully hereinafter from the following detailed description when taken in connection with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views:

Figure 1 is a transverse section through the center and one side of a hull construction illustrating the application of the seam construction to various joints in the bottom and side construction of a hull.

Figures 2 and 3 illustrate steps in the construction of a plain lap joint as illustrated in Figure 1.

Figures 4 and 5 illustrate steps in the effecting of a joint between members approaching at an angle, and Figures 6 and 7 illustrate the application of the invention in conjunction with a keel construction.

Referring to Figure 1 there is illustrated generally a keel construction 10, a hull bottom 12 and hull siding 14. To effect lapped joints between the bottom sheathing or the side sheathing through the use of spot welds and seam welding, particularly where stainless steel is employed, and a water tight joint is required without the necessity of calking, a joint such as is shown at 16 may be made. Referring to Figures 2 and 3, wherein the details of the method of fabricating such a joint are illustrated, it will appear that to effect a joint between the side members or sheets 18 and 20, which in the present instance may be composed of high tensile strength stainless steel, soft stainless steel angle pieces 22 and 24 are seam welded to the side sheets 18 and 20 as at 26 and 28. The angle pieces are secured to the side sheets 18 and 20 in such a position before assembly of the sheets so that upon assembly the sheets 18 and 20 may overlap one another and the protruding portions 30 and 42 of the angle pieces are in juxtaposition.

As is illustrated in Figure 3, the side sheets 18 and 20 after having been supplied with angle pieces 22 and 24 may be brought into nesting position as illustrated in Figure 3 and the projecting portions 30 and 32 of the angle pieces may thereafter be seam welded as at 34. By this construction the use of roller welding electrodes 33 and 35 for effecting the seam weld 34 from the outside of the joint is made practical. Thereafter the projecting portions of the angle pieces being composed of soft stainless steel may readily be bent to the position shown in the joint of Figure 1 and caused to lie flat against the side sheet 20. The overlapped side sheets 18 and 20 may thereafter be spot welded at frequent intervals as at 36 and if desired, a high strength strip of stainless steel 38 having an offset 40 therein to conform to the thickness of the sheet 20 may thereafter be positioned over the lapped joint and the sealing strips 22 and 24. If desired, the stainless steel joint covering strip 38 may additionally be provided with a further offset portion 42 which may completely cover the sealing strips and hide them completely from view from the outside. The spot welds 36 may be effected after the positioning of the joint covering strip thereover and may embrace the thicknesses of the sheets 18 and 20, the sealing strips 22 and 24 as well as the covering strip 38, or if desired, some of the spot welds may embrace only the strip members 18 and 20 and sealing strips 22 and 24 interposed therebetween and others embrace the entire five thicknesses. The cover strip may additionally be spot welded to the sheet 18 by a series of spaced welds as illustrated at 44.

A similar weld may be effected between sheet members such as 18 and 46 which approach one another at a considerable angle as illustrated. To effect the seam construction of the present invention to such a joint, sealing strips 48 and 50 are seam welded to the side sheets 18 and 46 through seam welds 52 and 54. Such seam welds may be effected prior to the assembly of the sheets and thus ready access to both sides of the sheets for the use of roller electrodes is afforded.

Referring to Figure 4, it will be observed that the protruding portions 56 and 58 of the sealing strips 48 and 50 may be readily seam welded as at 60 through the use of roller welding electrodes 33 and 35, ready access being afforded.

After effecting the seam weld 60 the protruding portions 56 and 58 of the sealing strips may be bent alongside and into engagement with the sheet 46 as is illustrated in Figure 5 and thereafter, as in a hull construction, a chine angle strip 62 may be positioned over the joint and secured to the sheets 46 and 18 through a series of spot welds 64 and 66. It may be practical to effect some of the welds through the sheet 18 and strip 48 or the sheet 46 and strips 48 and 50, or all the spot welds may be passed through the entire thickness as illustrated in Figure 1. As in the lapped joint previously described a chine strip may be provided with an offset portion 68 which may likewise be welded to the sheet 46 through a series of spot welds 70, thus completely covering the seam construction and effecting a neat appearance.

The principles above set forth in connection with the two joints illustrated may also be applied in conjunction with a keel construction, one form of which has been illustrated in Figure 1 and the method of forming illustrated in Figures 6 and 7.

Referring to these figures there will appear main longitudinally extending keel members 80 and 82 to which the bottom sheet 12 is to be secured in water tight fashion. Between the keel members 80 and 82 is also placed a channel spacing member 84 adapted to extend along the length of the members 80, 82. All of these members may be of high strength stainless steel. To afford a water tight connection and to practice the invention above disclosed soft sealing strips 86 and 87 may be seam welded to the right and left-hand bottom strips 12 as at 88 and 89 with portions 90 and 91 of the sealing strip extending beyond the flanged edges 92 and 93 of the bottom sheets. A sealing strip of channel shape 94 is formed around the channel 84, the channel being sufficiently deep to afford projecting portions 96 and 97. The projecting portions 96 and 97 are, as illustrated in Figure 6, seam welded to the extending portions 90 and 91 as shown at 98 and 99. Thereafter, since the channel seam strip 94 and the seam strips 86 and 87 may be deformed and bent out of the way as is illustrated in Figure 1 or in Figure 7. In Figure 1 the steam strips are bent at right angles in order to not interfere with the introduction of spacing members 100 located between the flanges of the channel member 84. The bottom sheets 12 and keel members 80 thereafter may be spot welded at spaced intervals as at 102, the spot welds either extending through the bottom sheets 12 and the adjacent keel member as well as the seam strips or through the bottom sheets 12, keel members and a flange of the channel member 84. If desired, as illustrated in Figure 7, the spot welds may additionally extend through the folded over portions 104 of the seam strips 94 and 86 thereby securing the parts rigidly together. To trim the keel a channel member 106 suitably flanged at 108 may be provided around the keel structure, the same nesting around the seam construction and producing a neat appearance. To hold the channel in place the bottom sheets 12, keel members 80, 82 and seam members as well as the channel member 84 may be provided with a series of spaced apertures 110 aligned with the spacing members 100, and threaded fastenings such as screws may be passed through the apertures 110 and threaded into the spacing member 100. It will be understood that the threaded fastenings will be adapted to be tightened sufficiently to create a water tight fit around the apertures 110 so as to avoid leakage.

In each of the seam constructions described it will appear that, while the seam strips are of soft stainless steel and relatively low tensile strength, yet no tension stresses are applied thereto since in each instance the spot welds are additionally supplied between the high tensile strength stainless steel so that all joints are stressed in shear. While the shear stress may be transmitted through the soft low tensile strength seam strips, yet the seam strips are not under tension stresses. In practice the seam strips may have a thickness of .010 inch since no particular stress is laid thereon. Strips of such thickness are easily bent to any position which may be desired and convenient for the application of a seam welding tool as is illustrated in Figures 3 and 4, and as soon as the seam welding operation is completed, the strips are easily bent to any position as may be found desirable in creating a neat and flush appearance. In practice, the seam strips may be secured to either side of the high strength stainless steel sheets as may be desired and it will readily appear that the lapped joint shown in detail in Figure 1 may be readily formed at a corner if desired, or the corner joint of Figure 1, which in reality is a butt joint with a lap strip, may be employed in place of the lap joint illustrated.

It will appear from the foregoing that a water tight seam construction having the principles of the present invention may be readily constructed without expensive operations and which joint will in no way weaken the strength of an ordinary lap joint of the usual form employing spaced spot welds and requiring calking to secure against leakage.

While the invention has been described as being applicable to joints between sheets of stainless steel of high tensile strength, it will appear obvious that the invention is applicable to other metals equally well and, particularly where the sheet metals employed would be weakened by bending. In some instances the joint may be made between two members of different characteristics, in which case but a single seam strip might be employed or because of the joint permitting a gradual curve in nesting the protruding or extending seam welded portions, the use of a soft seam strip may be eliminated. For example, the curvature of the seam strip 48 as illustrated at 49 might, in the finished product, be so gradual as to permit extension of the sheet member 18 for this purpose, thereby eliminating the seam strips 62.

Though several embodiments of the invention and method of fabrication have been illustrated and described, it is to be understood that the invention is not limited thereto, but may be embodied in other various forms and arrangements as may be desired. As various changes in construction and arrangement of parts may be made without departing from the spirit of the invention, as will be apparent to those skilled in the art, reference will be had to the appended claims for a definition of the limits of the invention.

What is claimed is:

1. A water tight joint between over lapping metal sheets which comprises a pair of over lapping sheets, a pair of seam strips of deformable material interposed between the lapped sheets and extending beyond the edge of one of said sheets, one of said strips being continuously resistance seam welded to one sheet and the other strip being continuously resistance seam welded to the other sheet and said strips being continuously resistance-seam welded together where they extend beyond the edge of said one of said sheets.

2. A water tight joint between over lapping metal sheets which comprises a pair of over lapping sheets, a pair of seam strips of deformable material interposed between the lapped sheets and extending beyond the edge of one of said sheets, one of said strips being continuously resistance seam welded to one sheet and the other strip being continuously resistance seam welded to the other sheet and said strips being continuously resistance seam welded together where they extend beyond the edge of said one of said sheets and spot welds thru said over lapping sheets.

3. A water tight joint between overlapping metal sheets which comprises a pair of overlapping sheets, a pair of seam strips of deformable material with at least one of said strips interposed between the lapped sheets and extending outwardly from the lapped area, one of said strips being continuously resistance seam welded to one sheet and the other strip being continuously resistance seam welded to the other sheet, and said strips being continuously resistance seam welded together where said one strip extends outwardly from the lapped area.

4. A water tight joint between overlapping metal sheets which comprises a pair of overlapping sheets, a pair of seam strips of deformable material with at least one of said strips interposed between the lapped sheets and extending outwardly from the lapped area, one of said strips being continuously resistance seam welded to one sheet and the other strip being continuously resistance seam welded to the other sheet, and said strips being continuously resistance seam welded together where said one strip extends outwardly from the lapped area, and spot welds through said overlapping sheets.

5. A water tight joint between overlapping metal sheets which comprises a pair of overlapping sheets, a pair of seam strips of deformable material interposed between the lapped sheets and extending beyond the edge of one of said sheets, one of said strips being continuously resistance seam welded to one sheet and the other strip being continuously resistance seam welded to the other sheet and said strips being continuously resistance seam welded together where they extend beyond the edge of said one of said sheets, a lap strip overlying the joint formed by said sheets and strips, and welds attaching said last strip to a sheet and said strips.

WILLIAM L. DIETER.